(12) United States Patent
Cordobes

(10) Patent No.: US 11,346,118 B1
(45) Date of Patent: May 31, 2022

(54) SMALL STRUCTURE

(71) Applicant: Robert Samuel Cordobes, Acton, CA (US)

(72) Inventor: Robert Samuel Cordobes, Acton, CA (US)

( * ) Notice: Subject to any disclaimer, the term of this patent is extended or adjusted under 35 U.S.C. 154(b) by 0 days.

(21) Appl. No.: 17/195,372

(22) Filed: Mar. 8, 2021

Related U.S. Application Data

(60) Provisional application No. 62/986,980, filed on Mar. 9, 2020.

(51) Int. Cl.
*E04H 1/02* (2006.01)
*H02S 20/23* (2014.01)
*E04H 1/00* (2006.01)

(52) U.S. Cl.
CPC ............ *E04H 1/02* (2013.01); *E04H 1/005* (2013.01); *H02S 20/23* (2014.12)

(58) Field of Classification Search
CPC .......... E04H 1/02; E04H 1/12; E04H 1/1205; E04H 1/00; E04H 1/005; H02S 20/23; E04B 1/34815; E04B 1/348
See application file for complete search history.

(56) References Cited

U.S. PATENT DOCUMENTS

| | | | | |
|---|---|---|---|---|
| 3,638,380 | A * | 2/1972 | Perri | E04B 1/34807 52/79.12 |
| 4,198,791 | A * | 4/1980 | Kalkaslief | E04B 1/34861 52/35 |
| 6,494,013 | B2 * | 12/2002 | Winskye | E04B 1/24 52/220.2 |
| 2004/0231256 | A1 * | 11/2004 | Ohnishi | E04B 1/3483 52/236.7 |
| 2013/0232886 | A1 * | 9/2013 | Yoder | E04B 1/34315 52/79.1 |

* cited by examiner

*Primary Examiner* — Gisele D Ford
(74) *Attorney, Agent, or Firm* — Plager Schack LLP; Mark H. Plager; Michael J. O'Brien

(57) ABSTRACT

A small structure is configured to house a plurality of humans in individual apartments in a sustainable manner. The small structure has a plurality of central support I-beams joined to a roof. A plurality of structural I-beams is arranged and supported four feet from a first and second distal edges of the roof. A central wall joins the plurality of central support I-beams. An interior wall bisects the central wall plurality of central support I-beams along the roof to a first exterior wall and a second exterior wall and a second exterior wall. A third exterior wall and a fourth exterior wall join the first exterior wall to the second exterior wall. A floor surface is joined to the interior wall, the central wall, the first exterior wall, the second exterior wall, the third exterior wall and the fourth exterior wall.

6 Claims, 5 Drawing Sheets

TRANSITION FITTING
(STUB)

SMALL STRUCTURE

RELATED APPLICATION

This application claims priority to provisional patent application U.S. Ser. No. 62/986,980 filed on Mar. 9, 2020, the entire contents of which is herein incorporated by reference.

BACKGROUND

The embodiments herein relate generally to construction and civil engineering.

Prior to embodiments of the disclosed invention homelessness as a product of two factors: housing cost and utilities cost. Embodiments of the disclosed invention solve this problem.

SUMMARY

A small structure is configured to house a plurality of humans in individual apartments in a sustainable manner. The small structure has a plurality of central support I-beams joined to a roof. A first plurality of structural support I-beams is arranged four feet from a first distal edge of the roof. A second plurality of structural support I-beams is arranged four feet from a second distal edge of the roof A central wall joins the plurality of central support I-beams. An interior wall bisects the central wall plurality of central support I-beams along the roof to a first exterior wall and a second exterior wall and a second exterior wall. A third exterior wall and a fourth exterior wall joining the first exterior wall to the second exterior wall. A floor surface, joins to the interior wall, the central wall, the first exterior wall, the second exterior wall, the third exterior wall and the fourth exterior wall. The interior wall, the central wall, the first exterior wall, the second exterior wall, the third exterior wall and the fourth exterior wall are arranged to create four apartments within the small structure to house a plurality of humans.

In some embodiments, the roof further comprises a plurality of structural channels, joined to a composition panel. A roofing material joins a solar panel and the composition panel. A transition panel joined to each structural support I-beam further supports the first exterior wall and a second exterior wall.

In some embodiments, the small structure further comprises a restroom, a walk-in shower and tub, and a refrigerator, joined to the first exterior wall. A broom closet is joined to the second exterior wall. A table, an armoire, and a bed are arranged on the floor surface.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
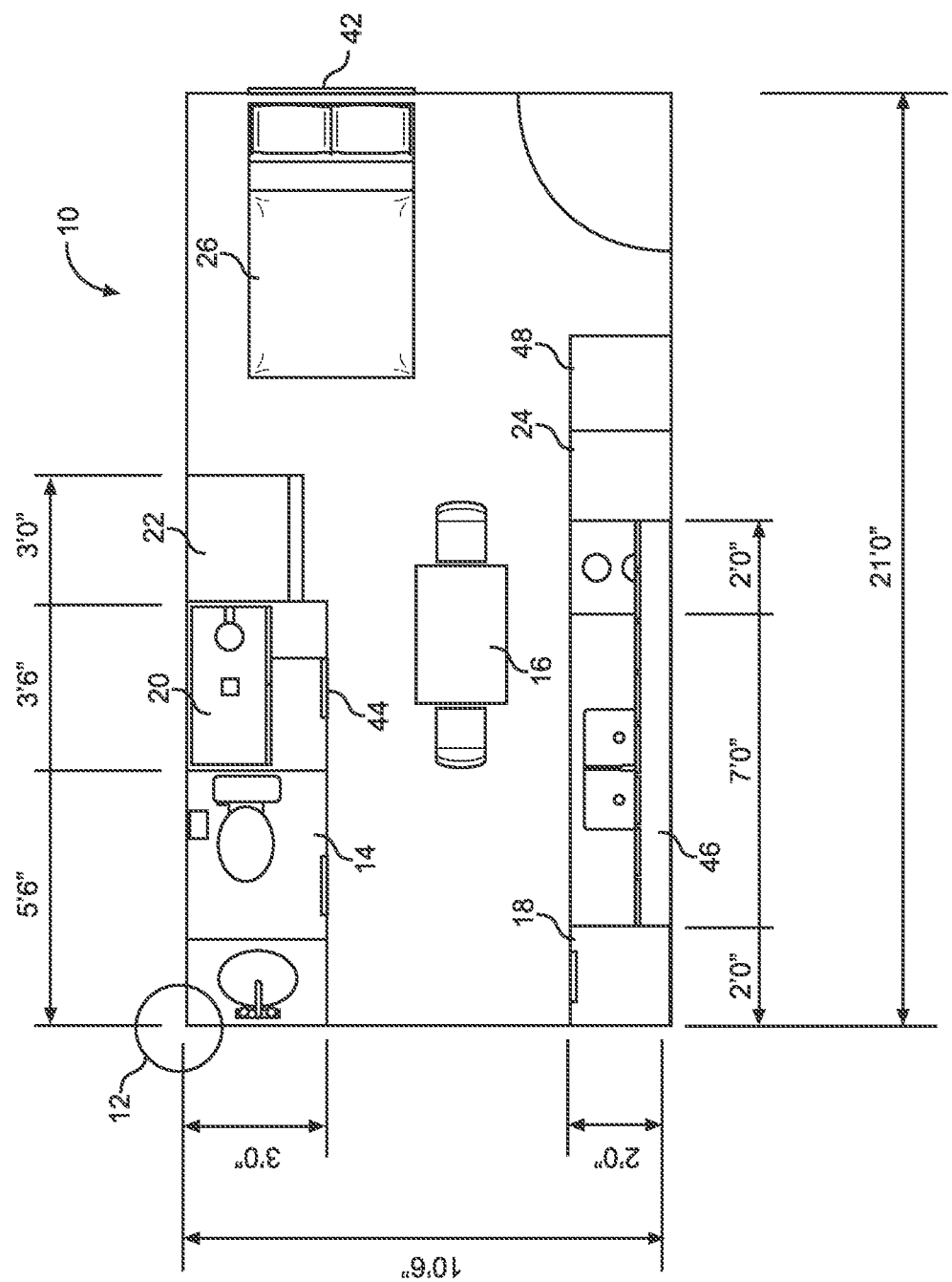
FIG. 1 shows a plan view of one embodiment of the present invention.
Figure 2:
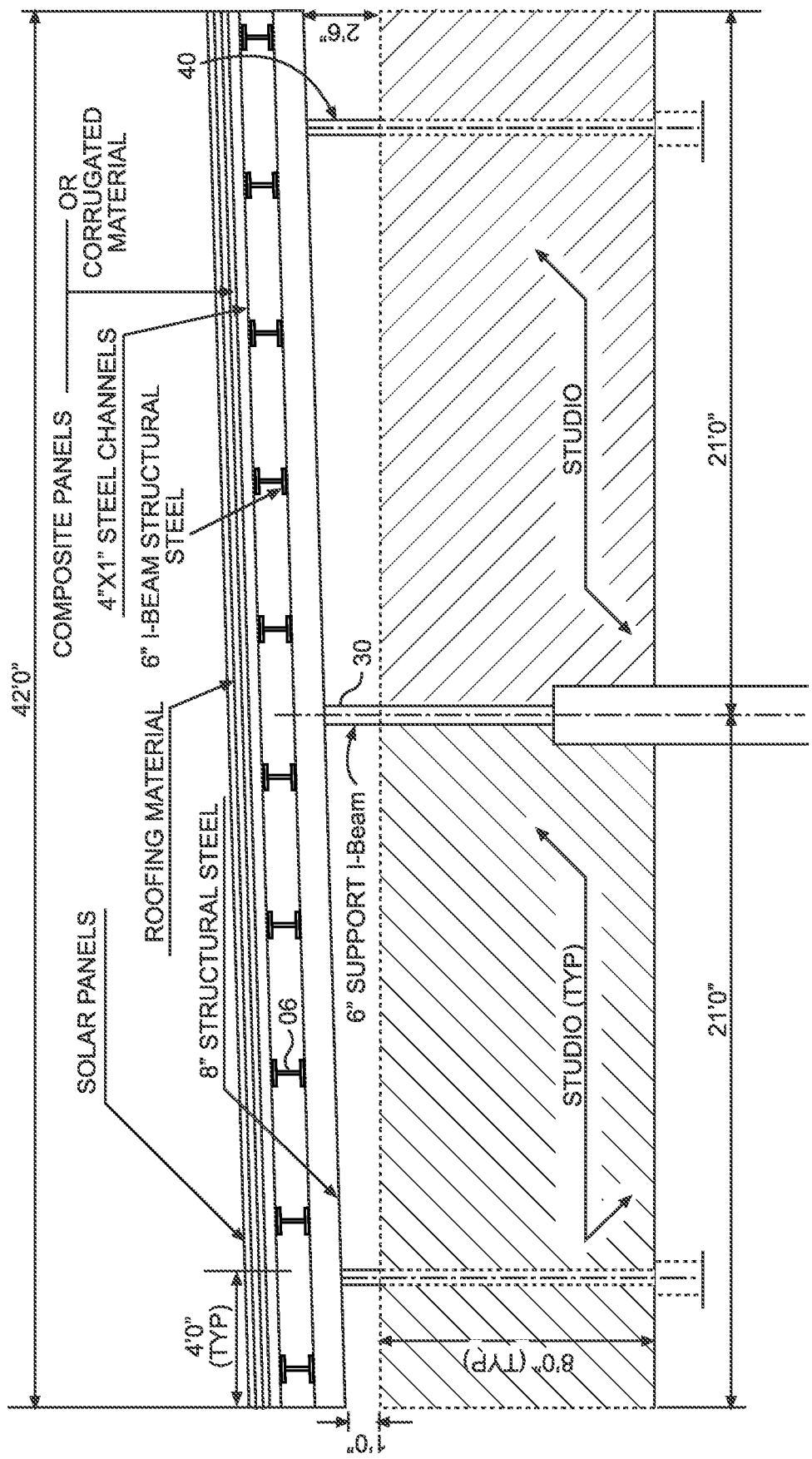
FIG. 2 shows a side view of one embodiment of the present invention.
Figure 3:
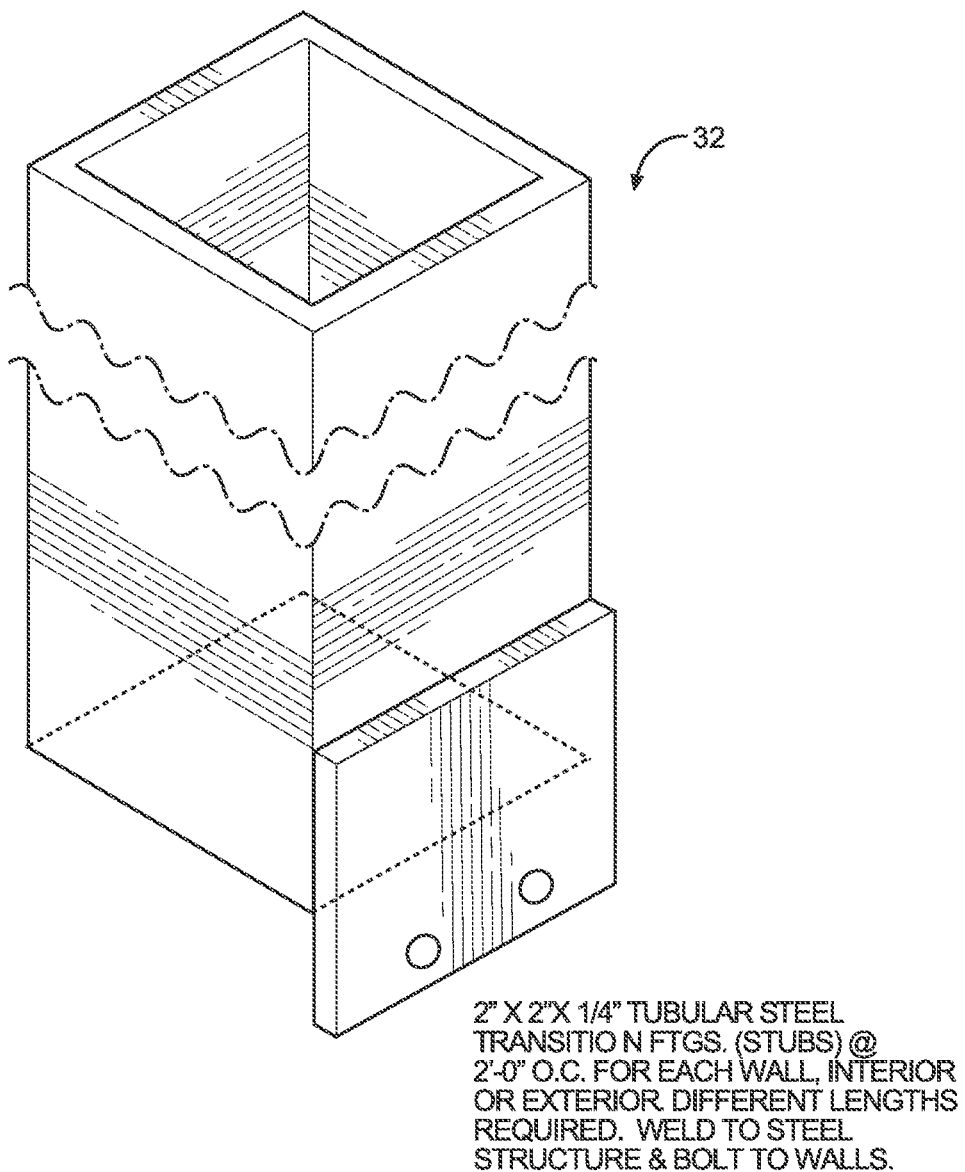
FIG. 3 shows a perspective view of one embodiment of the present invention.
Figure 4:
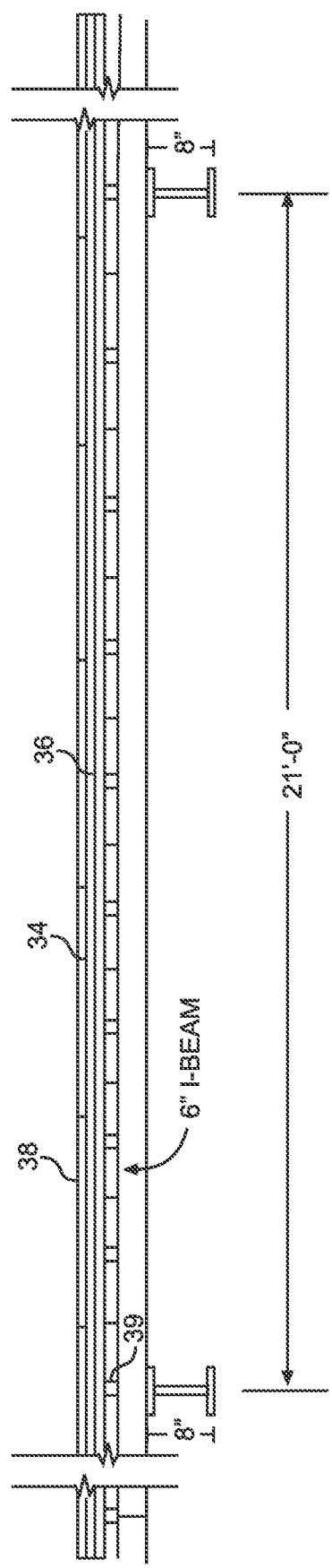
FIG. 4 shows a side view of one embodiment of the roofing sections of the present invention.
Figure 5:
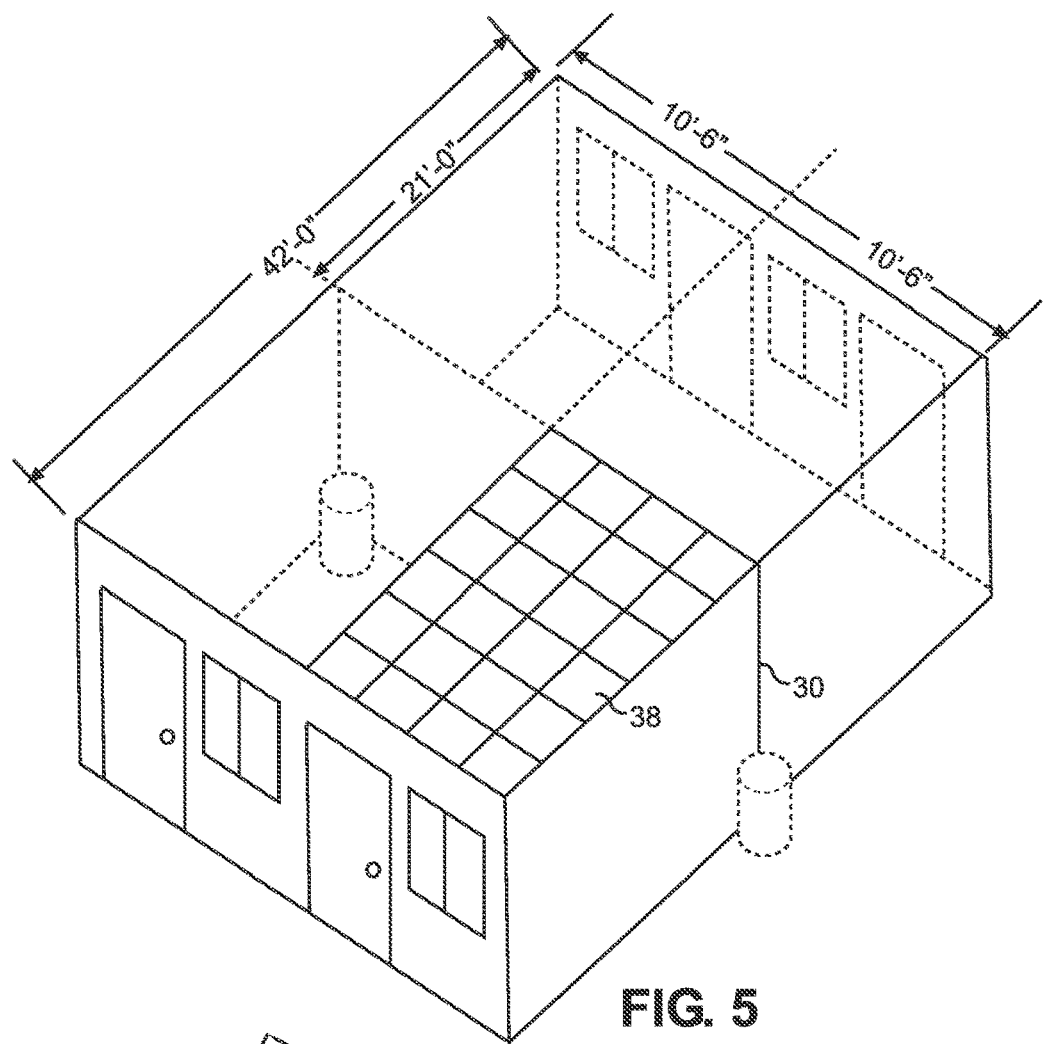
FIG. 5 shows an isometric view of one embodiment of the present invention.
Figure 6:
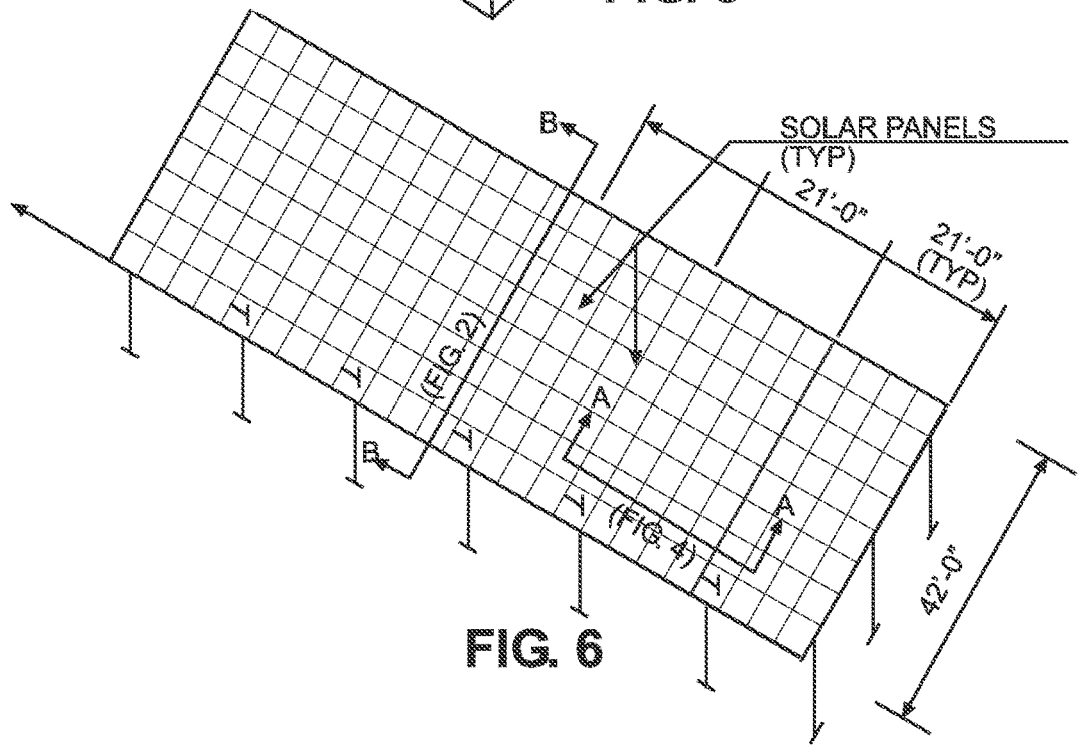
FIG. 6 shows a perspective view of one embodiment of the present invention.

By way of example, and referring to FIG. 1, one embodiment of a small structure has a structural steel support 12 that is joined to a floor surface and a ceiling surface above aground surface. The floor surface and the ceiling surface are joined to a plurality of interior and exterior walls. The first exterior wall and the second exterior wall each have a pair of doors leading into segregated apartments. This creates four small living spaces within the plurality of exterior walls. Each apartment further comprises a restroom 14, a table 16, a broom closet 18, a walk-in shower and tub 20, a refrigerator 22, a lounge 24 and bed 26.

A solar panel 28 is arranged on top of the small structure 10. A pair of steel support I-beams 30 are each joined to a ground surface with a transition fitting 32. The transition fitting 32 is joined to the floor, the third exterior wall and the fourth exterior wall.

The ceiling further comprises roofing material 34 joined to a composite panel 36. A roof 38 is joined to the composite panel 36 and the solar panel 28. The composite panel is joined to a plurality of steel channels 39. A steel pipe 40 is arranged into each steel channel 39 and travels through the exterior walls and into the ground surface.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A small structure, configured to house a plurality of humans in individual apartments in a sustainable manner, the small structure comprising:
   a plurality of central support I-beams joined to a roof;
   a first plurality of structural I-beams arranged and supported four feet from a first distal edge of the roof;
   a second plurality of structural I-beams arranged and supported four feet from a second distal edge of the roof;
   a central wall joining the plurality of central support I-beams;
   an interior wall, bisecting the central wall plurality of central support I-beams along the roof to a first exterior wall and a second exterior wall and a second exterior wall;
   a third exterior wall and a fourth exterior wall, joining the first exterior wall to the second exterior wall;
   a floor surface, joined to the interior wall, the central wall, the first exterior wall, the second exterior wall, the third exterior wall and the fourth exterior wall;
   a transition fitting, joined to at least two of the first plurality of structural I-beams, a ground surface, the floor surface, the third exterior wall, and the fourth exterior wall;
   wherein the interior wall, the central wall, the first exterior wall, the second exterior wall, the third exterior wall and the fourth exterior wall are arranged and supported to create four apartments within the small structure to house a plurality of humans.

2. The small structure of claim 1, wherein the roof further comprises:
   a plurality of structural channels, joined to a composite material panel;
   a roofing material joined to a solar panel and the composite material panel.

3. The small structure of claim 2, further comprising a transition panel, joined to each structural I-beam to further support the first exterior wall and a second exterior wall.

4. The small structure of claim 3, further comprising a restroom, a walk-in shower and tub, and a refrigerator, joined to the first exterior wall.

5. The small structure of claim 4, further comprising a broom closet, a kitchen sink, a stove, and kitchen cabinets joined to the second exterior wall.

6. The small structure of claim 5, further comprising a table, an armoire, a lounge chair and a bed, arranged and supported on the floor surface.

* * * * *